(12) United States Patent
Pahlevaninezhad et al.

(10) Patent No.: US 12,009,733 B2
(45) Date of Patent: Jun. 11, 2024

(54) HIGH VOLTAGE DC/DC CONVERTER WITH CURRENT SHAPING

(71) Applicant: SPARQ SYSTEMS INC., Kingston (CA)

(72) Inventors: Majid Pahlevaninezhad, Kingston (CA); Praveen Jain, Kingston (CA)

(73) Assignee: SPARQ SYSTEMS INC., Kingston (CA)

( * ) Notice: Subject to any disclaimer, the term of this patent is extended or adjusted under 35 U.S.C. 154(b) by 15 days.

(21) Appl. No.: 17/887,941

(22) Filed: Aug. 15, 2022

(65) Prior Publication Data

US 2024/0055972 A1    Feb. 15, 2024

(51) Int. Cl.
*H02M 1/00* (2006.01)
*H02J 3/32* (2006.01)
*H02J 3/38* (2006.01)
*H02J 7/35* (2006.01)
*H02M 3/335* (2006.01)

(52) U.S. Cl.
CPC .......... *H02M 1/0025* (2021.05); *H02J 3/32* (2013.01); *H02J 3/381* (2013.01); *H02J 7/35* (2013.01); *H02M 1/0012* (2021.05); *H02M 3/33573* (2021.05); *H02M 3/33584* (2013.01); *H02J 2207/20* (2020.01); *H02J 2300/24* (2020.01)

(58) Field of Classification Search
CPC .......... H02M 1/0025; H02M 3/33573; H02M 1/0012; H02M 3/33584; H02M 1/00; H02M 3/335; H02J 3/32; H02J 3/381; H02J 7/35; H02J 2207/20; H02J 2300/24; H02J 3/28; H02J 3/38
See application file for complete search history.

(56) References Cited

FOREIGN PATENT DOCUMENTS

FR    2990309 A1 * 11/2013 ........ H02M 3/33507

OTHER PUBLICATIONS

FR2990309 A1 Images.*

* cited by examiner

*Primary Examiner* — Robert L Deberadinis
(74) *Attorney, Agent, or Firm* — Brion Raffoul

(57) ABSTRACT

Systems and methods for use in a high voltage DC/DC converter. The high frequency current passing through a transformer in the converter is shaped according to prevailing system conditions and to ensure optimal operation. The voltages across flying capacitors in the power circuit of the DC/DC converter are also balanced and long term behaviour of these voltages are tracked.

10 Claims, 13 Drawing Sheets

HIGH VOLTAGE DC/DC CONVERTER WITH CURRENT SHAPING

TECHNICAL FIELD

The present invention relates to power conversion. More specifically, the present invention relates to systems and methods for converting low voltage DC power from low power sources into high voltage DC power suitable to conversion into AC power for a power grid. Current passing through a transformer is continuously shaped based on prevailing system conditions for optimal operation.

BACKGROUND

There is a growing number of photovoltaic (PV) applications where direct current/alternating current (DC/AC) inverters are required to provide maximum power point tracking (MPPT) to harvest maximum solar energy from PV panels and to thereby feed clean AC electricity into the power grid. However, the energy generated by solar energy harvesting systems depends on weather conditions and can be quite intermittent. Energy storage systems can effectively resolve the issue of intermittency for solar energy harvesting systems by storing the energy and releasing power when necessary.

Two different power electronic converters are commonly used, a converter for the PV and a converter for the energy storage. FIG. 1 is a block diagram for a known solar energy harvesting system with energy storage capability (Prior Art). From FIG. 1, it can be seen that two separate power electronic converters are used in the system. In this system, the PV inverter is used to perform MPPT for the PV panels and to convert the harvested energy into AC power that is compatible with the AC grid. The battery inverter controls the charge-discharge of the energy storage and also converts power from DC to AC. The main issue with the architecture in FIG. 1 is that two separate power electronic converters are needed and, as a result, the system may not be cost-effective. Another issue is that, when two separate power electronic converters are used, the PV inverter does not have real-time information for the battery (e.g., state of charge, etc.) while the battery inverter does not have real-time information for the PV system (e.g., available power, etc.). This architecture is therefore not able to optimise the power flow between different components of the system (i.e., between the PV panels, battery, the grid, and the various loads).

To address the above issues, other architectures that combine both the PV and the battery were introduced. FIG. 2 shows an exemplary arrangement of such an architecture (Prior Art). From FIG. 2, it can be seen that the system includes a DC/DC converter between the PV and the battery/energy storage unit, a DC/AC inverter to convert DC power from the battery and/or from the DC/DC converter to AC power, and a low frequency transformer to increase the AC voltage to a voltage suitable for the grid and to provide galvanic isolation. In this architecture, the primary side of the transformer is low voltage (e.g., ~48V) and the secondary side is high voltage (~240V). Thus, the electronic components that are used can have low voltage ratings. The main drawback of this architecture is the low frequency transformer—this transformer is very bulky, heavy, and has significant losses. Thus, this architecture cannot be used for higher power (great than a few kW) and is not very scalable in terms of power.

In order to eliminate the low frequency transformer, the DC/DC converter can be designed to provide isolation. FIG. 3 shows a known architecture that does without the low frequency transformer (Prior Art). According to this figure, the DC/DC converter provides enough gain as well as the galvanic isolation. This architecture can provide both high efficiency and high power density. However, the energy storage subsystem needs to be high voltage for this architecture. That is, the energy storage subsystem needs to be higher in voltage than the peak voltage of the grid. For instance, if the inverter is designed to operate with the universal voltage range (e.g., $V_{rms}(max)=264$, $V_{peak}=372$), the minimum voltage of the energy storage subsystem should be fairly high (e.g., ~400 V). Accordingly, the voltage range of the energy storage subsystem is very limited and many types of batteries cannot be used with this architecture. In addition, this architecture may also have lower reliability issues due to the use of such high voltage energy storage subsystems.

Based on the above, there is therefore a need for systems and devices which mitigate if not avoid the shortcomings of the prior art.

SUMMARY

The present invention provides systems and methods for use in a high voltage DC/DC converter. The high frequency current passing through a transformer in the converter is shaped according to prevailing system conditions and to ensure optimal operation. The voltages across flying capacitors in the power circuit of the DC/DC converter are also balanced and long-term behaviour of these voltages are tracked.

In a first aspect, the present invention provides a system for converting DC power to AC power suitable for an AC power grid, said DC power coming from either at least one PV panel or an energy storage subsystem, the system comprising:
- a DC/DC low voltage converter for producing output DC power from received from at least one PV panel, said output DC power being for charging an energy storage subsystem;
- a bi-directional high voltage (HV) DC/DC converter for converting low voltage DC power from said energy storage subsystem into high voltage DC power, said high voltage DC/DC converter being coupled to said energy storage subsystem;
- a DC/AC inverter receiving high voltage DC power from said high voltage DC/DC converter, said DC/AC inverter being for converting said high voltage DC power from said high voltage DC/DC converter into AC power suitable for use with a utility grid, said DC/AC inverter being coupled between said high voltage DC/DC converter and said grid; and
- a control system for controlling parameters across components of said system.

In one aspect, the HV DC/DC converter shapes a high frequency current passing through a transformer in its power circuit based on sensed operating conditions and tracks long-term behaviour of voltages in flying capacitors used in its power circuit.

In a third aspect, the present invention provides a high voltage DC/DC converter comprising:
- a power circuit for converting incoming low voltage DC power into high voltage DC output power;
- a control system comprising:
  - a charge/discharge controller for generating a reference current value, said reference current value being used by said converter as a basis for shaping a high frequency current passing through a transformer, said reference current value being based on current operating conditions for said converter, said charge/discharge controller receiving current and voltage values from sources of said incoming low voltage DC power and from destinations of said high voltage DC output power;

a high frequency current shaper for generating timing pulses used to shape said high frequency current flowing through said transformer, said timing pulses being based on said reference current value;

a geometric switching pulse generator for generating switching pulses for semiconductors in said power circuit based on said timing pulses from said current shaper, said switching pulses being for adjusting flying capacitor voltages in said power circuit for optimal operation of said high voltage converter.

In one embodiment, the HF current shaper comprises:

an HF current level generator block for receiving the reference current value and for generating different current levels necessary to achieve different functions for the converter, the different current levels being determined such that an average value of a resulting waveform for the high frequency current is equal to the reference current value;

a comparator and timing pulse generator block for receiving the different current levels from the HF current level generator block and for generating timing pulses for use in controlling the semiconductors in the power circuit to achieve the resulting waveform for the high frequency current.

Yet another embodiment uses a geometric switching pulse generator that comprises:

a voltage level controller for determining how many semiconductors in the power circuit are to be active;

an edge detector block for generating suitable signals when rising or falling edges in the timing pulses are detected;

a geometric pulse generator for generating gate pulses for semiconductors in both the primary side and the secondary side of the transformer, the gate pulses being based on input from the voltage level controller and the edge detector block, the gate pulses being further based on the high frequency current;

a symbolic dynamics controller for maintaining voltages of the flying capacitors in said power circuit, the symbolic dynamics controller also being for tracking long-term behaviour of the voltages of the flying capacitors.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
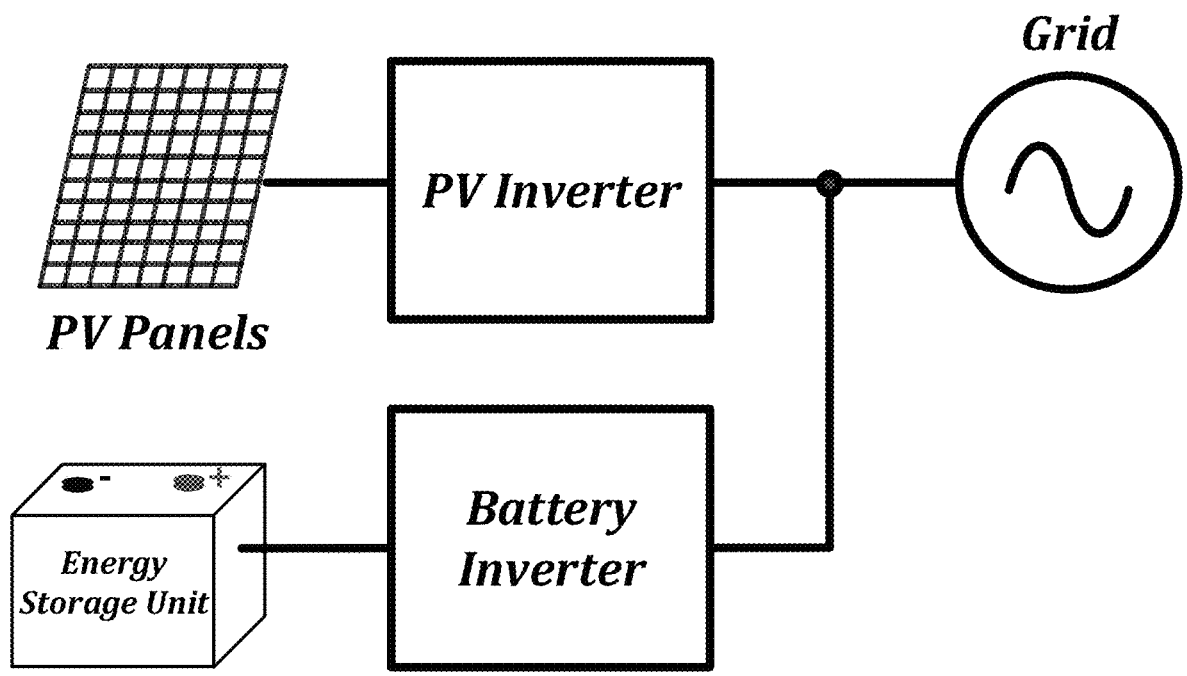
FIGS. 1 to 3 are block diagrams of systems according to the prior art.
Figure 2:
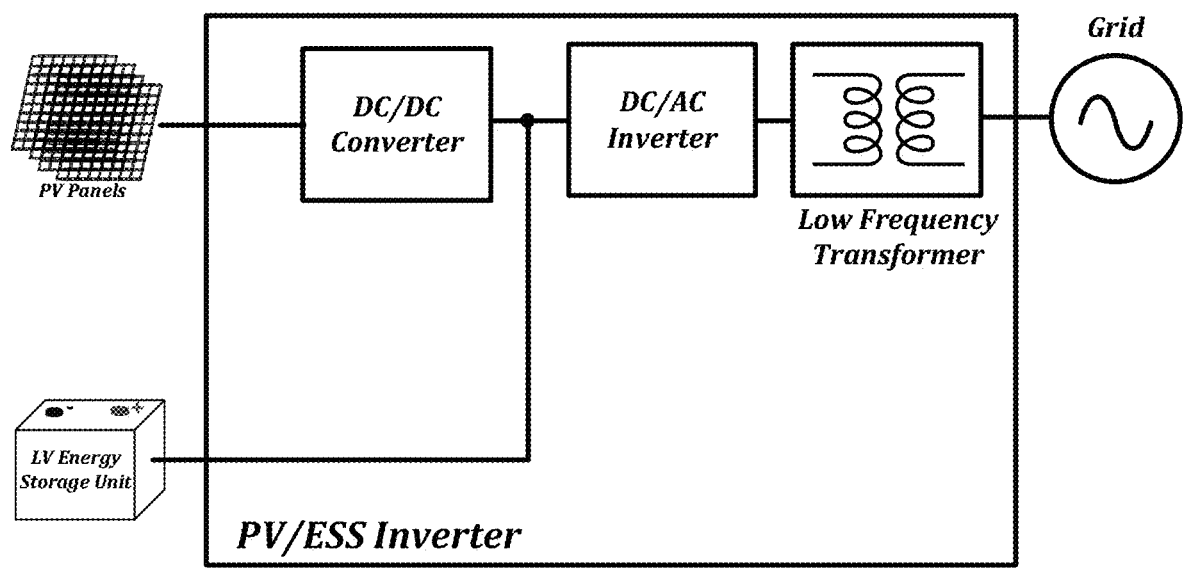
Figure 3:
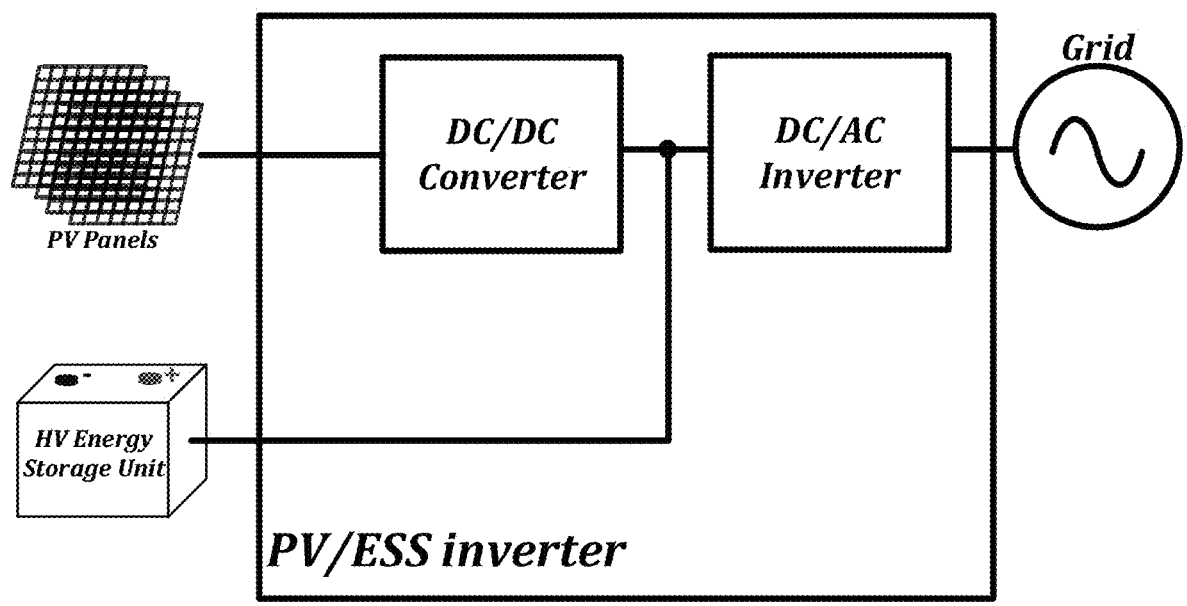
Figure 4:
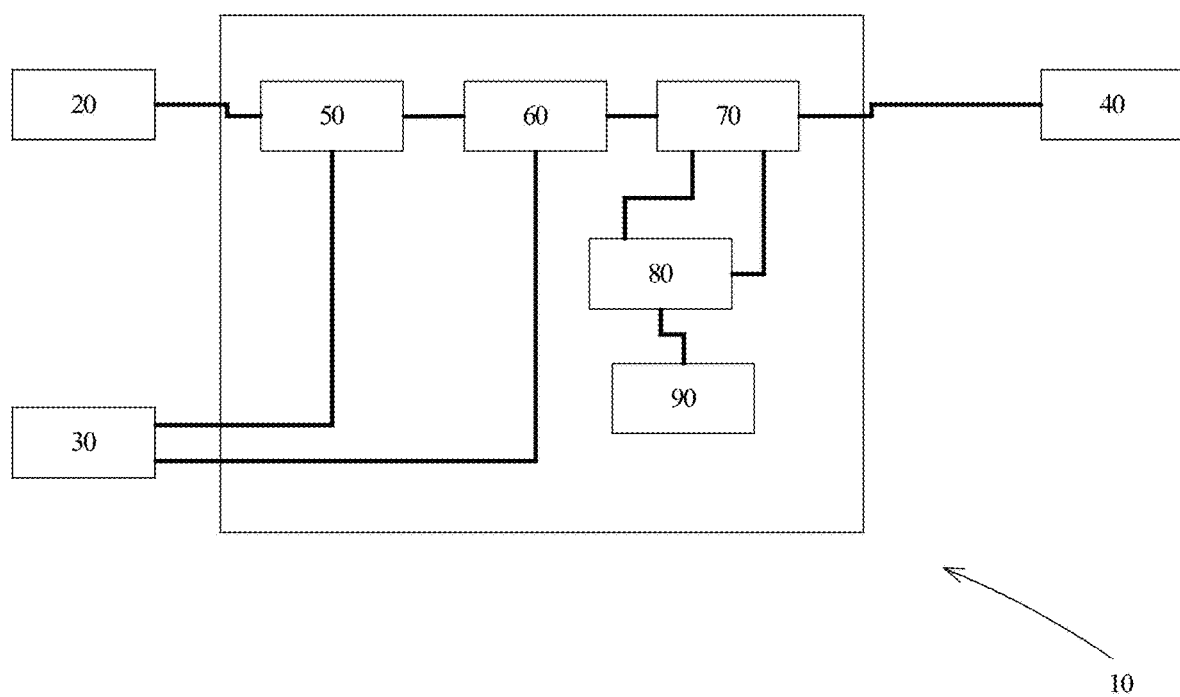
FIG. 4 is a block diagram of a system according to one aspect of the present invention.

In one aspect, the present invention provides a micro-inverter that couples to at least one PV panel, an energy storage subsystem (e.g., a battery subsystem), and a power grid. Referring to FIG. 4, a block diagram of such a micro-inverter is illustrated. As can be seen, the system 10 couples to at least one PV panel 20, an energy storage unit 30, and to a power grid 40. The system 10 includes a low voltage (LV) DC/DC converter 50 that receives DC power from the PV panels 20 and converts this DC power into DC power suitable for the energy storage unit 30. The LV DC/DC converter 50 feeds the converted DC power to the energy storage unit 30 to charge the unit 30. The system 10 also includes a bidirectional high voltage (HV) DC/DC converter 60 that is coupled to the energy storage unit 30. The HV DC/DC converter 60 converts the low voltage DC power it receives from the energy storage unit 30 into high voltage DC power suitable for a DC/AC inverter 70. The HV DC/DC converter also controls the power flow to and from the energy storage unit 30. The HV DC/DC converter 60 controls whether the energy storage unit 30 is being charged or not. As noted in the Figure, the system 10 includes a DC/AC inverter 70 that receives high voltage DC power from the HV DC/DC converter 60. The DC/AC inverter 70 produces AC power from the high voltage DC power and feeds this AC power to the grid 40. A control system 80 controls the various components of the system 10. A communications subsystem 90 communicates with the control system 80 to receive commands and send back readings as needed to external components/users.

Figure 5:
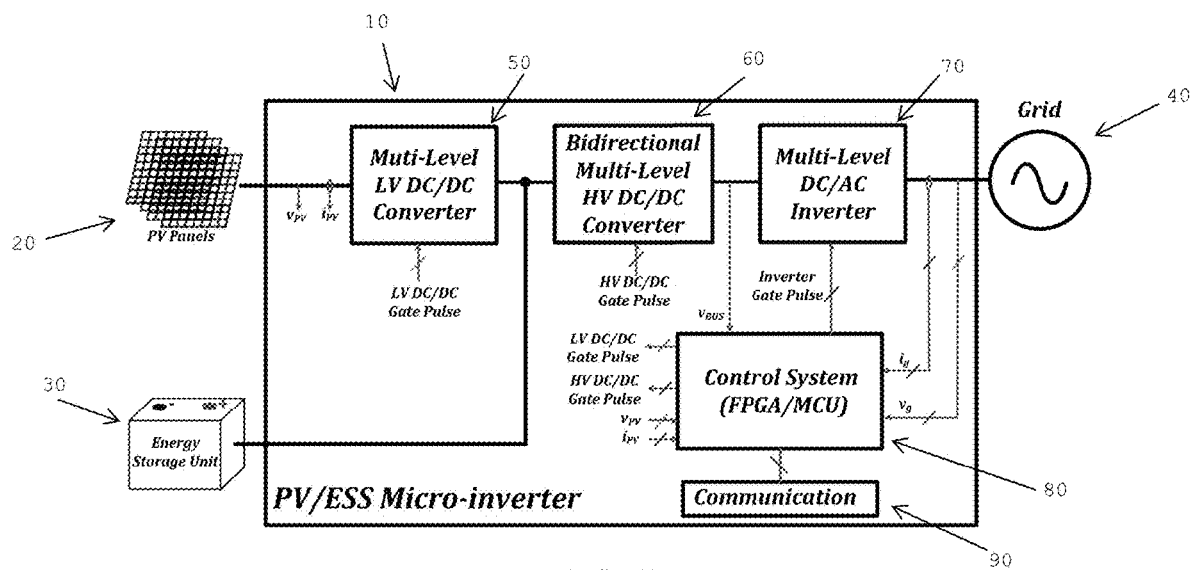
FIG. 5 is a block diagram of a specific implementation of the system illustrated in FIG. 4.

Referring to FIG. 5, a block diagram of one implementation of a micro-inverter according to one aspect of the present invention is illustrated. As can be seen, FIG. 5 shows the inputs and outputs of the various components of the system 10.

In one implementation, the LV DC/DC converter 50 DC/DC low voltage converter is based on differential geometry such that capacitor voltages for capacitors in the low voltage converter converge to nominal values as operating conditions of said system change.

As can be seen, the micro-inverter includes a HV DC/DC converter 60. This DC/DC converter 60 shapes a high frequency current passing through the transformer in the power circuit of the HV DC/DC converter. This current shaping is based on sensed operating conditions such as the battery/energy storage voltage, the available power from the PV panels, the output DC bus voltage, the grid voltage, and the grid current. The HV DC/DC converter 60 also tracks the long-term behaviour of voltages in flying capacitors used in its power circuit and this data can be used to optimize the converter's operation.

The DC/AC inverter 70 may also be based on a differential geometry control scheme. Such an inverter receives the operating conditions of the destination grid (including grid voltage and grid current), the capacitance voltages of the flying capacitors in its power circuit, and the DC bus voltage. Based on these inputs, the DC/AC inverter controls its flying capacitor voltages such that these voltages converge to a suitable nominal/optimal solution as system conditions change.

Figure 6:
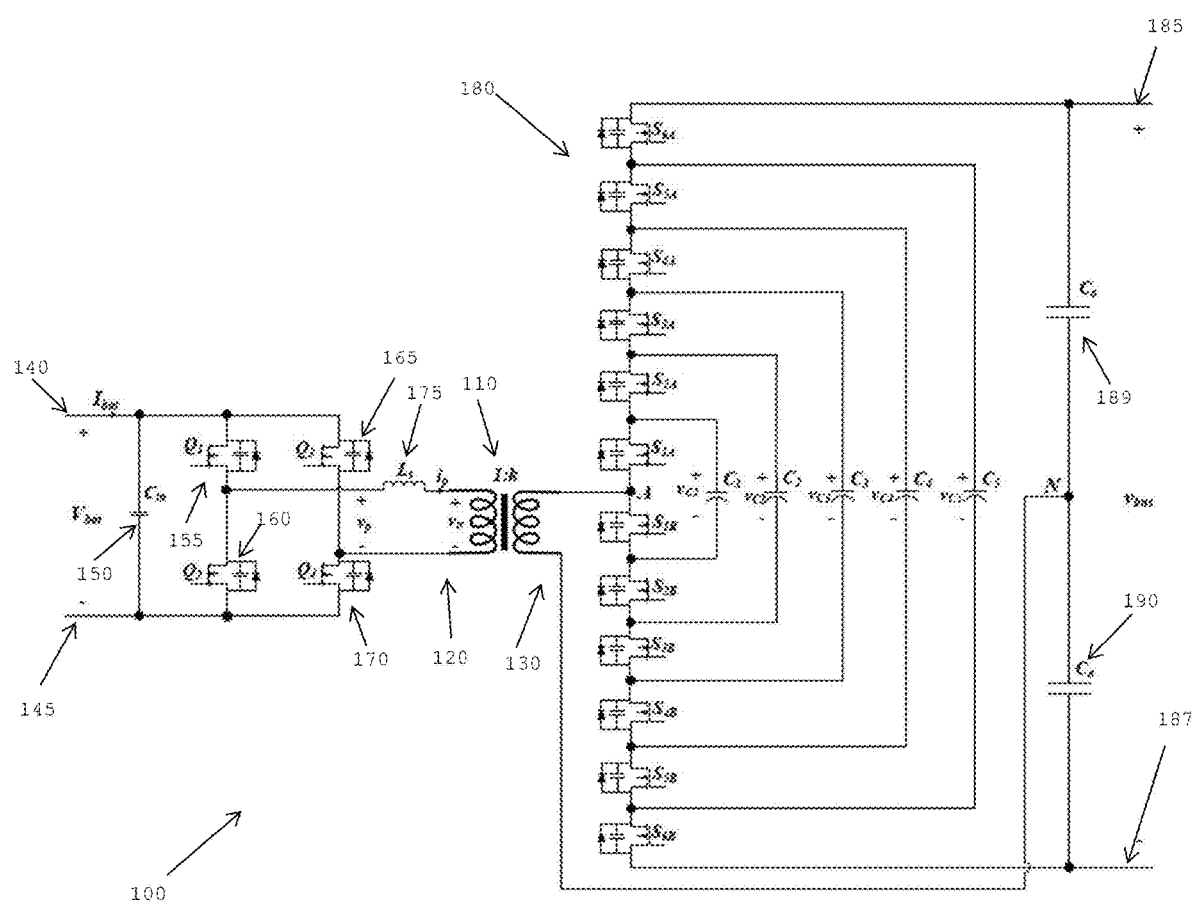
FIG. 6 is a block diagram of a power circuit for a high voltage DC/DC converter according to another aspect of the present invention.
Figure 7:
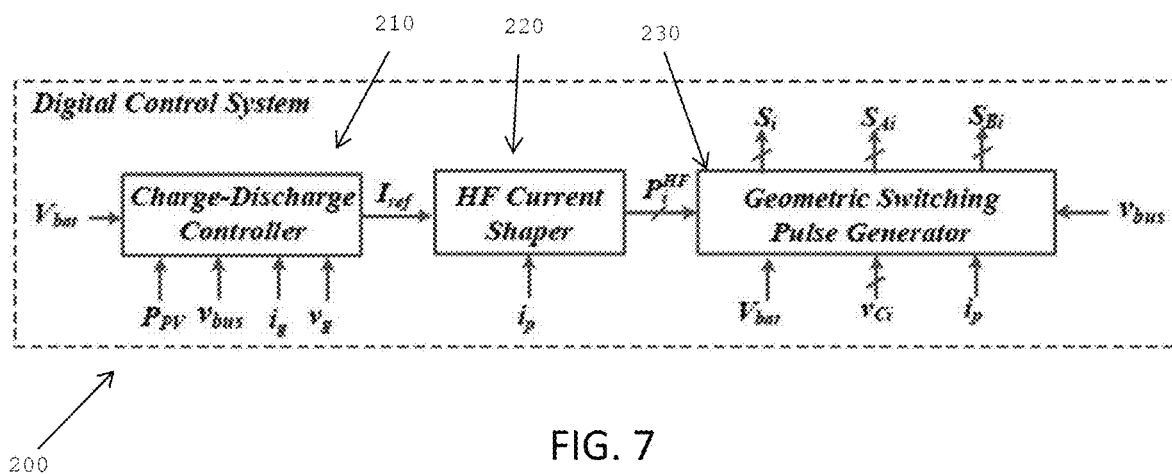
FIG. 7 is a block diagram of a control system for a high voltage DC/DC converter to control the power circuit in FIG. 6 as according to another aspect of the present invention.

Referring to FIG. 6 and FIG. 7, illustrated is an exemplary arrangement of the Bidirectional Multi-Level HV DC/DC Converter 60. FIG. 6 illustrates a power circuit 100 that is part of the DC/DC Converter 60 while FIG. 7 illustrates a converter controller 200 that is part of the converter 60 and which is used to control the power circuit 100. It should be clear that, although FIG. 6 and FIG. 7 show a six-level circuit, the architecture can be extended to an arbitrary number of levels. The Bidirectional Multi-Level HV DC/DC Converter 60 includes the following:

A power circuit 100 (see FIG. 6), which includes power semiconductors and passive components such as magnetics and capacitors. The power circuit is responsible for converting the input low DC voltage at the battery side into a high DC voltage at the DC bus (or DC-link) as output. The power circuit 100 as shown in FIG. 6 is capable of transferring power from a battery or energy storage subsystem to the DC bus (i.e., discharge mode) and from the DC bus to the battery/energy storage subsystem (i.e., charge mode);

A digital control system 200 (see FIG. 7), which includes a Charge-Discharge Controller block 210, a High-Frequency (HF) Current Shaper block 220, and a Geometric Switching Pulse Generator block 230. The digital control system 200 generates the appropriate gate pulses for the power semiconductors in the power circuit such that various control tasks (such as charge and discharge control of the energy storage) are performed.

In FIG. 6, the power circuit 100 includes a transformer 110. The transformer 110 has a primary (or input) side 120 and a secondary (or output) side 130. On the primary side, input leads 140, 145 receive an input current. Between the input leads is an input capacitor 150 and, across the input leads 140, 145 are two pairs of circuit element modules—a first pair of modules 155, 160 and a second pair of modules 165, 170. Between the first pair of modules 155, 160 is coupled an input inductor 175, with the input inductor being coupled between this midpoint of the first pair of modules 155, 160 and the transformer 110. The second end of this side of the transformer 110 is coupled to the midpoint between the second pair of modules 165, 170.

On the secondary side, there are a plurality of flying capacitors and a plurality of paired circuit element modules. The paired circuit element modules are coupled as a single chain 180 in a series configuration with each pair of circuit element modules being associated with a specific flying capacitor. The associated flying capacitor is coupled to be in parallel with the pair of circuit element modules that the flying capacitor is associated with. Thus, a flying capacitor is coupled between a first and a second coupling point on the chain and the pair of circuit element modules that is associated with the flying capacitor is coupled in series between the first and second coupling points. As can be seen, other circuit element modules may also be between those first and second coupling points. Output leads 185, 187 provide an output for the converter 60, with the chain 180 being coupled between these output leads 185, 187. Between these output leads 185, 187 are output capacitors 189, 190 coupled in series.

Also on the secondary side, the transformer 110 has a first lead that is coupled to the midpoint in the chain 180 of circuit element modules. The other lead of the transformer 110 is coupled to the midpoint between the output capacitors 189, 190. For clarity, the table below details which flying capacitors are associated with which pair of circuit element modules.

| First Circuit Element Module | Second Circuit Element Module | Associated Flying Capacitor |
|---|---|---|
| $S_{1A}$ | $S_{1B}$ | $C_1$ |
| $S_{2A}$ | $S_{2B}$ | $C_2$ |
| $S_{3A}$ | $S_{3B}$ | $C_3$ |
| $S_{4A}$ | $S_{4B}$ | $C_4$ |
| $S_{5A}$ | $S_{5B}$ | $C_5$ |
| $S_{6A}$ | $S_{6B}$ | $C_0$, $C_0$ (two output capacitors) |

Referring to FIG. 7, illustrated is a block diagram for the converter controller 200. As can be seen from FIG. 7, the Charge-Discharge Controller block 210 receives the battery voltage, $v_{bat}$, the available power from the PV panels, $P_{PV}$, the DC bus voltage, $v_{Bus}$, the grid voltage, $v_g$, the and the grid current, $i_g$, and generates an appropriate current reference for the input current of the Bidirectional Multi-Level HV DC/DC Converter, $I_{ref}$. It should be clear that the charge-discharge controller produces the current reference based on the received operating conditions as set out by the battery voltage, the available power, the grid voltage, and the grid current. Accordingly, the charge-discharge controller will process these inputs and, depending on the scenario as evidenced by these inputs, appropriate current reference values will be produced. In some implementations, specific scenarios will be programmed into the charge-discharge controller such that, when specific conditions are detected from the various inputs, specific current reference values will be produced to result in a desired output for the converter as a whole. Accordingly, programming of the charge-discharge controller will include many scenarios depending on the battery condition, PV condition, and grid condition. For various programmed scenarios, as detected from the various inputs, the reference value for the high frequency current is calculated and output as the current reference value. For example, if the battery is discharged and there is available power from PV, the current reference value is produced such that the battery is charged from the PV panel instead of being charged from the grid. Similarly, if the battery is fully charged, a suitable current reference value is produced such that the converter sends the power from the PV panels and/or from the battery to the grid. As detailed above, multiple scenarios can be programmed into the charge-discharge controller and, based on the detected scenario, appropriate current reference values are produced. It should be clear that, depending on the implementation, the charge-discharge controller may include many scenario profile and/or look-up tables (for different scenarios) and/or decision making sub-blocks.

Figure 8:
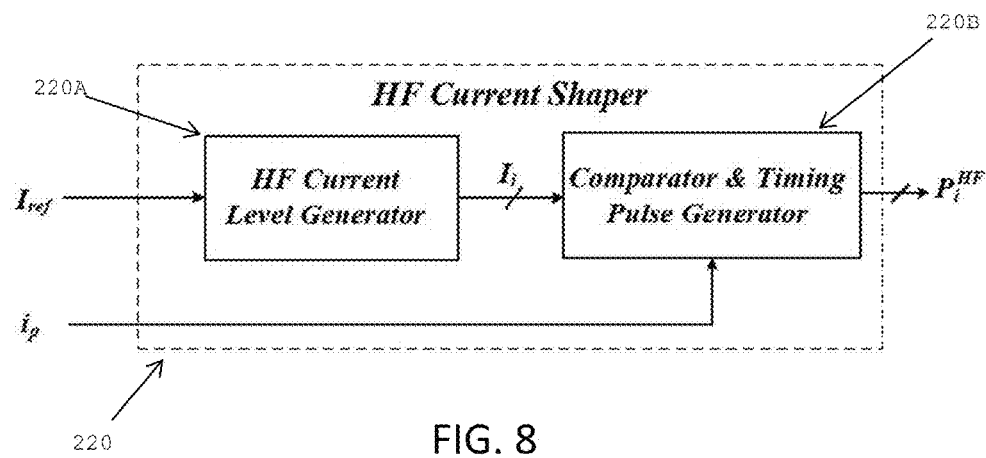
FIG. 8 is a block diagram of an HF current shaper block as shown in FIG. 7.

Referring to FIG. 8, a block diagram of the HF Current Shaper block 220 is illustrated. This block receives the current reference, $I_{ref}$, from the Charge-Discharge Controller block 210 and generates timing pulses, $P^{HF}_i$, for the high frequency current flowing through the transformer 110. The HF Current Shaper block 220 includes two components: an HF Current Level Generator block 220A and a comparator and timing pulse generator block 220B.

Figure 9:
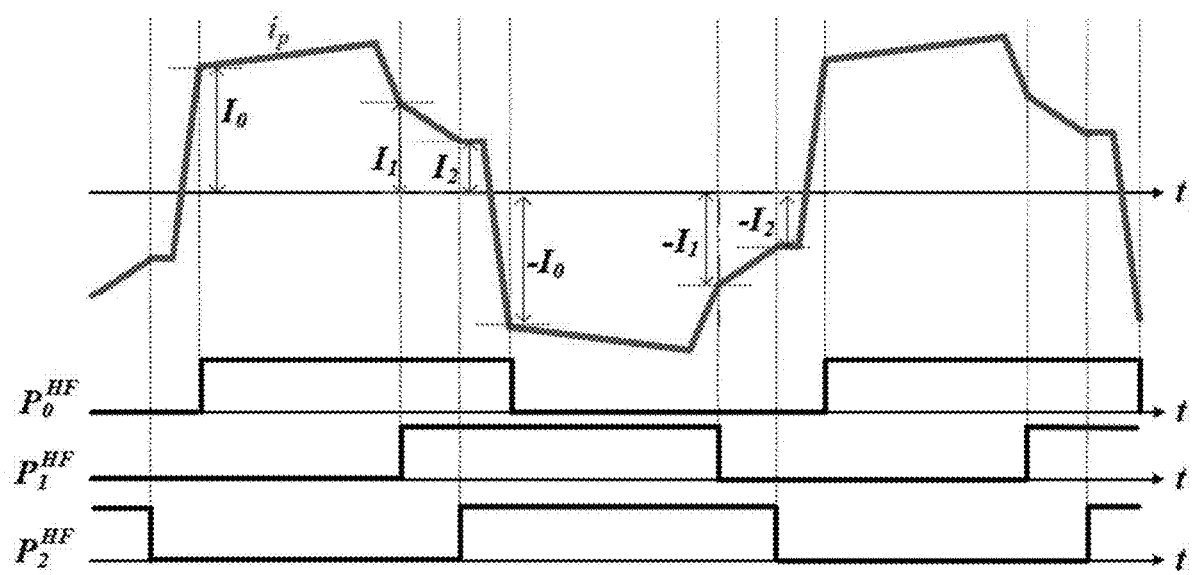
FIG. 9 is a timing and waveform diagram illustrating how pulses are generated using the HF current shaper block in FIG. 8.

The HF Current Level Generator block 220A receives the current reference, $I_{ref}$, and generates various current levels $I_i$ for the high frequency current flowing through the transformer 110. Referring to FIG. 9, illustrated is an exemplary high frequency current waveform along with different current levels (i.e., $I_0$, $I_1$, $I_2$). In this example, the first current level $I_0$ directly determines the amount of power processed by the converter 60. The second current level $I_2$ is the required current level necessary to achieve zero voltage switching for the power semiconductors in the power circuit. These levels are determined such that the average value of the rectified high frequency current waveform is equal to $I_{ref}$. Similarly, various other current levels are determined to not only achieve zero voltage switching but also the optimization of the rms value for the high frequency current passing through the transformer. The Comparator and Timing Pulse Generator block 220B receives the current levels $I_i$ for the high frequency current and generates appropriate timing pulses, $P^{HF}_i$. FIG. 9 shows an example of how the pulses are generated based on the high frequency current and respective current levels. As can be seen from FIG. 9, $P^{HF}_i$ turns on (high) when $i_p$ reaches the level of $I_i$ and turns off (low) when $i_p$ reaches the level of $-I_i$.

Figure 10:
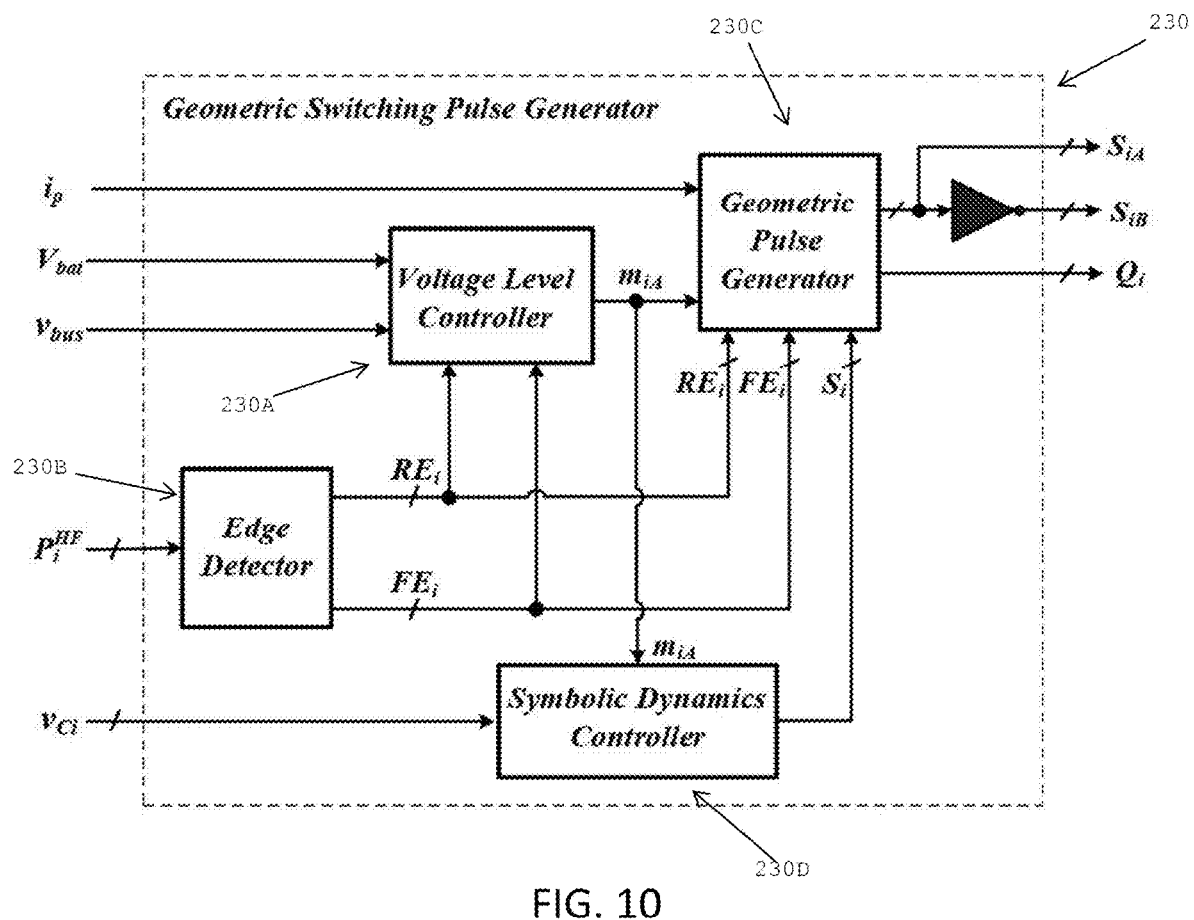
FIG. 10 is a block diagram of the Geometric Switching Pulse Generator block as illustrated in FIG. 7.

Referring to FIG. 10, illustrated is a block diagram of the Geometric Switching Pulse Generator block 230. This block 230 receives the high frequency current $i_p$ flowing through the transformer 110, the input voltage (i.e., the battery/energy storage voltage) $v_{bat}$, the output voltage (i.e., the DC bus voltage) $v_{bus}$, the voltages of the flying capacitors $v_{Ci}$, and the timing pulses, $p^{HF}_i$ (generated by the HF Current Shaper block 220). The outputs of this block 230 are the gate pulses for the power semiconductors in the power circuit. As can be seen from FIG. 10, the Geometric Switching Pulse Generator block 230 includes the following blocks:

- A Voltage Level Controller block 230A that determines the voltage level of the transformer secondary side based on the input voltage $V_{bat}$, output voltage $v_{bus}$, and the transformer's turns ratio (1:k). This block 230A effectively determines how many of the power semiconductors (i.e., $S_{iA}$,) are on (i.e., $m_{iA}$,);
- An Edge Detector block 230B that extracts the rising edges and falling edges of the timing pulses, $P^{HF}_i$. These rising and falling edges correspond to various current levels, $I_i$—this block outputs a rising edge ($RE_i$) signal when a rising edge is detected and a falling edge (FEi) signal when a falling edge is detected;
- A Geometric Pulse Generator block 230C that receives the high frequency current, $i_p$, the number of active switches, $m_{iA}$, in the power circuit, the rising edge signals, $RE_i$, the falling edge signals, $FE_i$, and the signal, $S_i$, which represents the preferred active switches. This block 230C generates the gate pulses for the primary-side power semiconductors, $Q_i$, and the secondary-side power semiconductors, $S_{iA}$ and $S_{iB}$;
- A Symbolic Dynamics Controller block 230D, which determines the configuration of the secondary-side power semiconductors in order to keep balanced the voltages across the flying capacitors. This block effectively tracks the voltages of the flying capacitors and converts the voltage values into information. The symbolic dynamics can be realised by using the following exemplary mapping:

$$\rho_i(t) = \begin{cases} 0 & \text{when } |v_{Ci}(t) - V_{Ci}^{Nom}| \leq \delta_{Vci} \\ 1 & \text{when } |v_{Ci}(t) - V_{Ci}^{Nom}| > \delta_{Vci} \end{cases}$$

$$\text{for } i = 1, 2, 3, \ldots, N$$

where $V_{Ci}^{Norm}$ is the nominal value of the voltage across the $i^{th}$ flying capacitor, $\delta_{Vci}$ is a threshold value (which represents the voltage interval in which the flying capacitor voltage can fluctuate), and N is the number of flying capacitors.

For clarity:

$\rho_i(t)$ is a stream of bits that represents the dynamic behaviour of the respective flying capacitor voltage where each bit shows whether the respective capacitor voltage is within the pre-specified interval or not for each switching cycle. As an example, $\rho_i(t)$=0.100111 . . . means that the capacitor voltage $V_{Ci}$ was within the range in the first switching cycle, then out of the range for the next two cycles and back within for the next three.

This mapping and the symbolic dynamics track the long-term behaviour of the voltages of the flying capacitors and can be used to extract various patterns and strategies to maintain balanced voltages.

Figure 11:
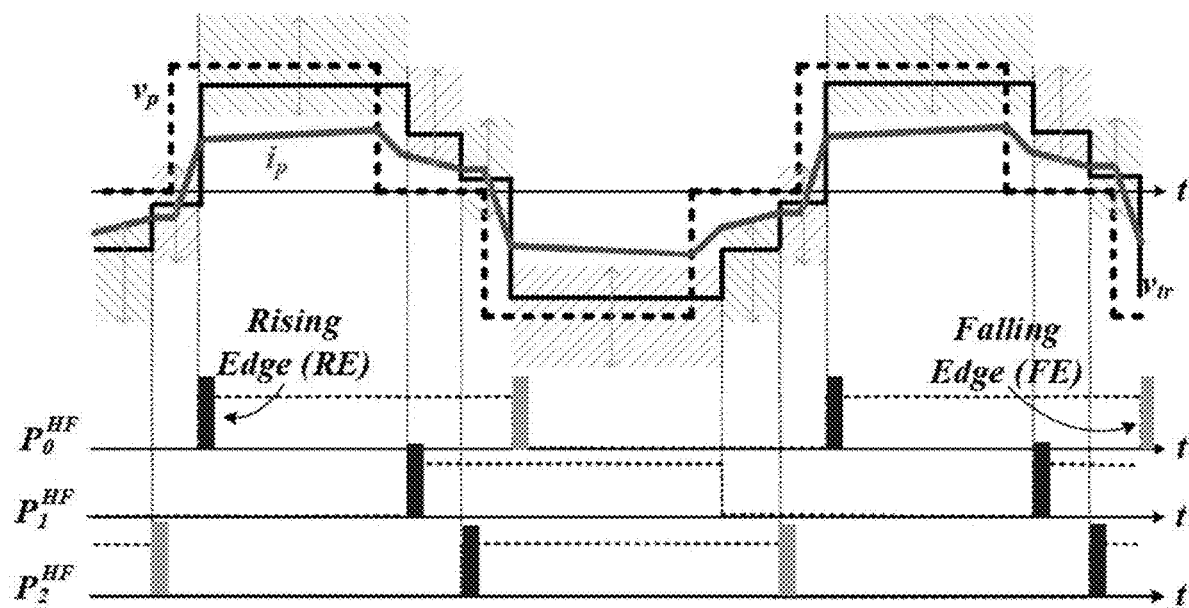
FIG. 11 illustrates a waveform and timing diagram for the converter illustrated in FIG. 7 and shows how timing signals are generated based on the high frequency current.

Referring to FIG. 11, illustrated are key waveforms for the bidirectional Multi-Level HV DC/DC Converter. In FIG. 11, the voltage $v_p$ at the output of the primary-side bridge, the high frequency current, $i_p$, and the voltage $v_{tr}$ across the transformer are shown. Due to the multi-level structure at the secondary side of the transformer, the voltage level across the transformer can be adjusted to shape the high frequency current, $i_p$, and to thereby achieve optimum operation (e.g., minimised rms value for the high frequency current, $i_p$). This figure also shows how the timing signals are generated based on the high frequency current, $i_p$.

Figure 12:
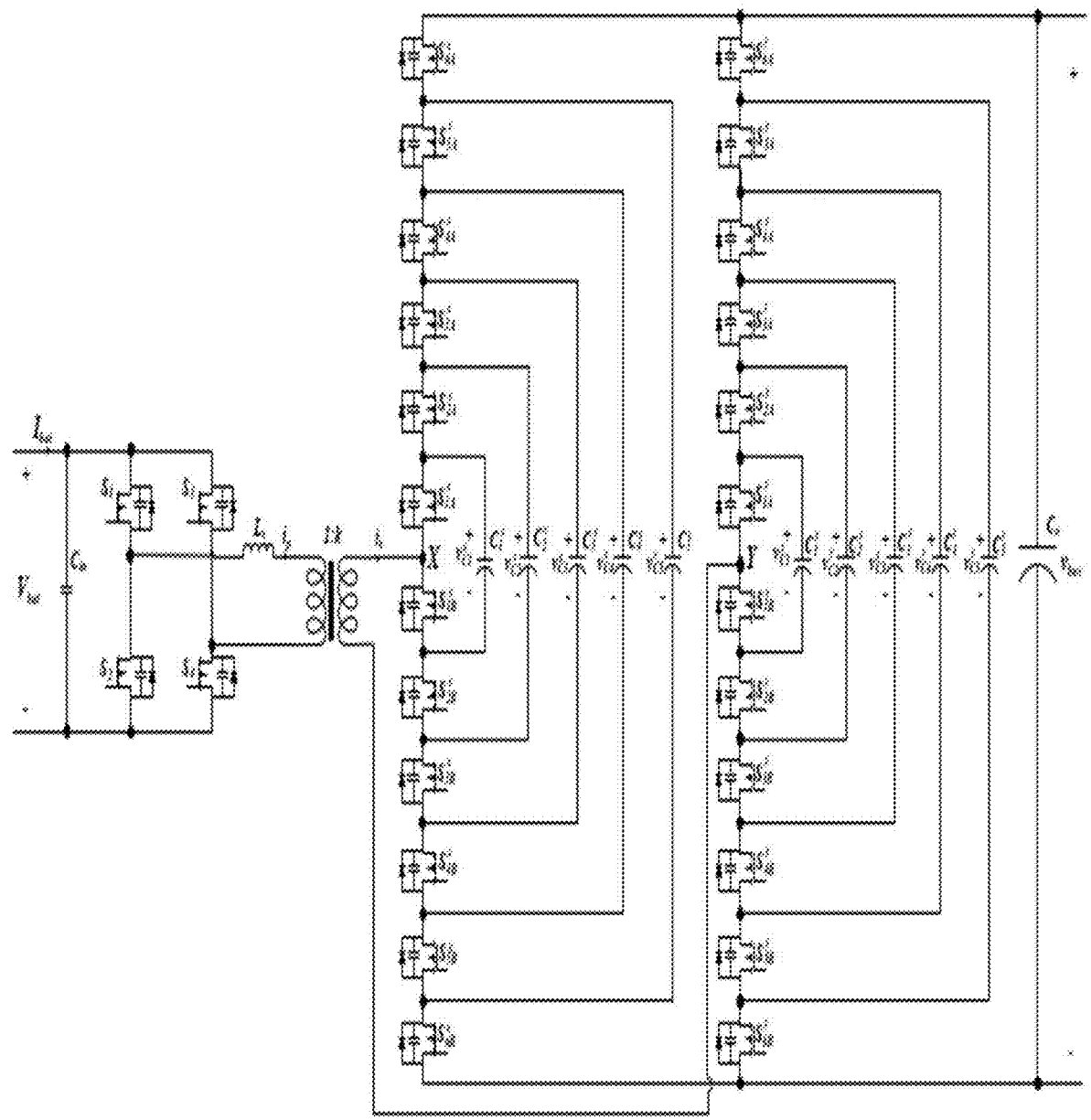
FIG. 12 is a variant of the power circuit illustrated in FIG. 6.

Referring to FIG. 12, illustrated is a variant of the bidirectional Multi-Level HV DC/DC Converter shown in FIG. 6. In this variant, instead of a single chain of series coupled circuit element modules, two chains are used, with each chain being in parallel with the other. Each chain is configured as the single chain in FIG. 6, with each chain having a plurality of flying capacitors and a plurality of paired circuit element modules. For each paired circuit element modules, there is a corresponding associated specific flying capacitor. The associated flying capacitor is coupled to be in parallel with the pair of circuit element modules that the flying capacitor is associated with. Thus, a flying capacitor is coupled between a first and a second coupling point on the chain and the pair of circuit element modules that is associated with the flying capacitor is coupled in series between the first and second coupling points. As can be seen, other circuit element modules may also be between those first and second coupling points. For this variant, the first lead of the transformer is coupled to the midpoint of the first chain of modules while the second lead of the transformer is coupled to the midpoint of the second chain of modules. The output of this secondary side power circuit is taken across the last output capacitor of the second chain.

As can be seen from FIG. 12, the HV DC/DC converter uses a full-bridge multi-level circuit at the secondary side. This configuration can provide more voltage levels and, in turn, more flexibility to optimally shape the high frequency current, $i_p$. By optimally shaping the high frequency current, soft switching as well as other performance improvements can be achieved.

Figure 13:
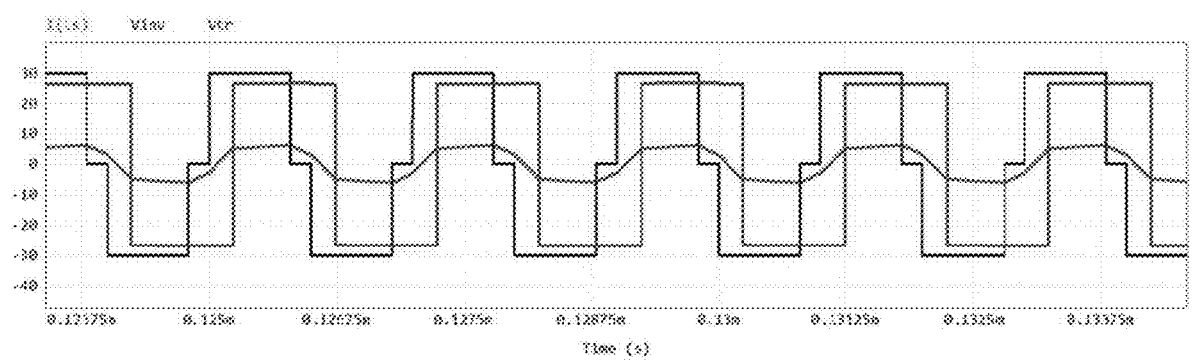
FIG. 13 shows simulation results (voltage at the output of the primary side) for the high voltage DC/DC converter according to one aspect of the present invention.
Figure 14:
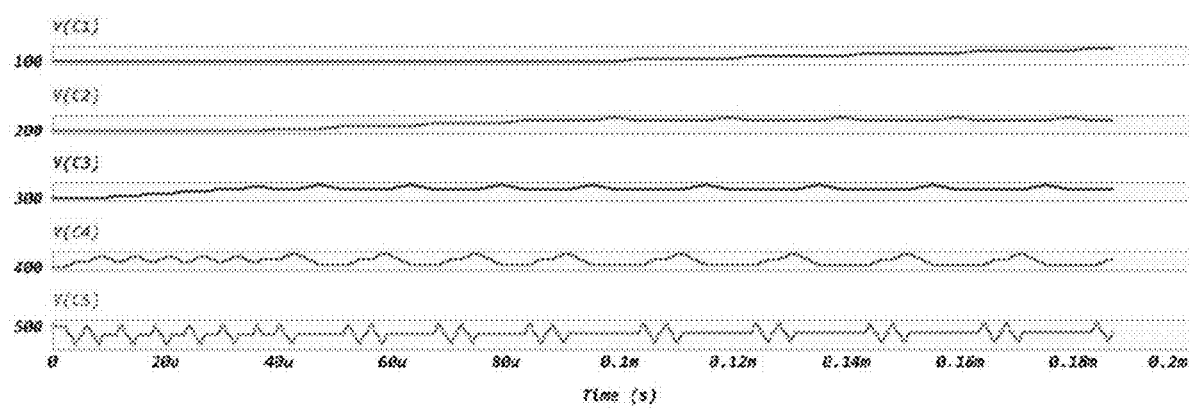
FIG. 14 also shows simulation results (voltage balancing for the flying capacitors) for the high voltage DC/DC converter according to one aspect of the present invention.

FIG. 13 and FIG. 14 show some simulation results for the bidirectional Multi-Level HV DC/DC Converter. FIG. 13 shows the voltage at the output of the primary-side bridge, $v_p$, the high frequency current, $i_p$, and the voltage across the transformer, $v_{tr}$ while FIG. 14 shows the balancing of the voltages across the flying capacitors.

A person understanding this invention may now conceive of alternative structures and embodiments or variations of the above all of which are intended to fall within the scope of the invention as defined in the claims that follow.

We claim:

1. A system for converting DC power to AC power suitable for an AC power grid, said DC power coming from either at least one PV panel or an energy storage subsystem, the system comprising:
    a DC/DC low voltage converter for producing output DC power from received from at least one PV panel, said output DC power being for charging an energy storage subsystem;
    a bi-directional high voltage DC/DC converter for converting low voltage DC power from said energy storage subsystem into high voltage DC power, said high voltage DC/DC converter being coupled to said energy storage subsystem;
    a DC/AC inverter receiving high voltage DC power from said high voltage DC/DC converter, said DC/AC inverter being for converting said high voltage DC power from said high voltage DC/DC converter into AC power suitable for use with a utility grid, said DC/AC inverter being coupled between said high voltage DC/DC converter and said grid; and
    a control system for controlling parameters across components of said system,
    wherein said high voltage DC/DC converter shapes a high frequency current passing through a transformer in a power circuit of said HV DC/DC converter based on sensed operating conditions and tracks long-term behaviour of voltages in flying capacitors used in said power circuit.

2. The system according to claim 1, wherein said high voltage DC/DC converter comprises:
    a power circuit for converting incoming low voltage DC power into high voltage DC output power; and
    a control system comprising:
        a charge/discharge controller for generating a reference current value, said reference current value being used by said converter as a basis for shaping a high frequency current passing through said transformer, said reference current value being based on current operating conditions for said converter, said charge/discharge controller receiving current and voltage values from sources of said incoming low voltage DC power and from destinations of said high voltage DC output power
        a high frequency current shaper for generating timing pulses used to shape said high frequency current flowing through said transformer, said timing pulses being based on said reference current value; and
        a geometric switching pulse generator for generating switching pulses for semiconductors in said power circuit based on said timing pulses from said current shaper, said switching pulses being for adjusting flying capacitor voltages in said power circuit for optimal operation of said high voltage converter.

3. A high voltage DC/DC converter comprising:
    a power circuit for converting incoming low voltage DC power into high voltage DC output power; and
    a control system comprising:
        a charge/discharge controller for generating a reference current value, said reference current value being used by said converter as a basis for shaping a high frequency current passing through a transformer, said reference current value being based on current operating conditions for said converter, said charge/discharge controller receiving current and voltage values from sources of said incoming low voltage DC power and from destinations of said high voltage DC output power;
        a high frequency current shaper for generating timing pulses used to shape said high frequency current flowing through said transformer, said timing pulses being based on said reference current value; and
        a geometric switching pulse generator for generating switching pulses for semiconductors in said power circuit based on said timing pulses from said current shaper, said switching pulses being for adjusting flying capacitor voltages in said power circuit for optimal operation of said high voltage converter.

4. The DC/DC converter according to claim 3, wherein said power circuit comprises:
    a plurality of circuit element modules;
    a transformer having a primary side and a secondary side, said primary side of said transformer receiving an input current, said secondary side of said transformer producing an output current,
    wherein, on said primary side of said transformer, said power circuit comprises:
        a first and a second pair of circuit element modules, each pair of circuit element modules being coupled in series between input leads, said input leads receiving said input current for said converter;
        an input capacitor coupled between said input leads; and
        an input inductor,
    and wherein, on said secondary side of said transformer, said power circuit comprises:
        a plurality of pairs of circuit element modules, each of said circuit element modules comprising a semiconductor; and
        a plurality of said flying capacitors, each flying capacitor being associated with a specific pair of circuit element modules wherein:
        each of said plurality of circuit element modules is coupled in series to other circuit element modules to form a chain of circuit element modules;
        each flying capacitor is coupled between a first coupling point and a second coupling point in said chain of circuit element modules and each flying capacitor and each pair of circuit element modules are arranged in said chain such that, for each specific flying capacitor, a specific pair of circuit element modules associated with said specific flying capacitor is coupled in said chain between a specific first coupling point and a specific second coupling point between which said specific flying capacitor is coupled; and said switching pulses produced by said geometric switching pulse generator control said semiconductors in said circuit element modules, and wherein, on said primary side, a first input lead of said transformer is coupled to a first input coupling point between modules of said first pair of circuit element modules, said input inductor being coupled between said first input coupling point and said transformer; and a second input lead of said transformer is coupled to a second input coupling point between modules of said second pair of circuit element modules and wherein, on said secondary side, a first output lead of said transformer is coupled to a first output coupling point that is midway in said chain of circuit element modules; and a second output lead of said transformer is coupled to a second output coupling point that is between two output capacitors that are coupled in series, said two output capacitors being coupled in series to each other and said two capacitors in series are coupled in parallel with said chain of circuit element modules.

5. The DC/DC converter according to claim 3, wherein said HF current shaper comprises:

an HF current level generator block for receiving said reference current value and for generating different current levels necessary to achieve different functions for said converter, said different current levels being determined such that an average value of a resulting waveform for said high frequency current is equal to said reference current value; and a comparator and timing pulse generator block for receiving said different current levels from said HF current level generator block and for generating timing pulses for use in controlling said semiconductors in said power circuit to achieve said resulting waveform for said high frequency current.

6. The DC/DC converter according to claim 3, wherein said geometric switching pulse generator comprises:

a voltage level controller for determining how many semiconductors in said power circuit are to be active;

an edge detector block for generating suitable signals when rising or falling edges in said timing pulses are detected;

a geometric pulse generator for generating gate pulses for semiconductors in both said primary side and said secondary side of said transformer, said gate pulses being based on input from said voltage level controller and said edge detector block, said gate pulses being further based on said high frequency current; and a symbolic dynamics controller for maintaining voltages of said flying capacitors in said power circuit, said symbolic dynamics controller also being for tracking long-term behaviour of said voltages of said flying capacitors.

7. The DC/DC converter according to claim 3 wherein said power circuit comprises:

a plurality of circuit element modules;

a transformer having a primary side and a secondary side, said primary side of said transformer receiving an input current, said secondary side of said transformer producing an output current, wherein, on said primary side of said transformer, said power circuit comprises:

a first and a second pair of circuit element modules, each pair of circuit element modules being coupled in series between input leads, said input leads receiving said input current for said converter;

an input capacitor coupled between said input leads; and an input inductor, and wherein, on said secondary side of said transformer, said power circuit comprises:

a plurality of pairs of circuit element modules, each of said circuit element modules comprising a semiconductor; and a plurality of said flying capacitors, each flying capacitor being associated with a specific pair of circuit element modules, wherein:

each of said plurality of circuit element modules is coupled in series to other circuit element modules to form two chains of circuit element modules, a first chain being in parallel with a second chain;

each flying capacitor is coupled between a first coupling point and a second coupling point in said chain of circuit element modules and each flying capacitor and each pair of circuit element modules are arranged in said chain such that for each specific flying capacitor, a specific pair of circuit element modules associated with said specific flying capacitor is coupled in said chain between a specific first coupling point and a specific second coupling point between which said specific flying capacitor is coupled; and said switching pulses produced by said geometric switching pulse generator control said semiconductors in said circuit element modules; and wherein, on said primary side, a first input lead of said transformer is coupled to a first input coupling point between modules of said first pair of circuit element modules, said input inductor being coupled between said first input coupling point and said transformer; and a second input lead of said transformer is coupled to a second input coupling point between modules of said second pair of circuit element modules and wherein, on said secondary side, a first output lead of said transformer is coupled to a first output coupling point that is midway in said first chain of circuit element modules; and a second output lead of said transformer is coupled to a second output coupling point that is midway in said second chain of circuit element modules.

8. The DC/DC converter according to claim 3, wherein said charge-discharge controller calculates said current reference value based on one or more scenarios detected by way of said current operating conditions.

9. The DC/DC converter according to claim 8, wherein a calculated value for said current reference value causes at least one of:

charging an energy storage subsystem connected to said DC/DC converter from a connected PV panel;

charging said energy storage subsystem using power derived from a power grid;

sending power from said PV panel to said power grid; and sending power from said energy storage subsystem to said power grid.

10. The DC/DC converter according to claim 8, wherein said one or more scenarios for said current reference value are determined by way of at least one of: look-up tables and decision making sub-blocks.

* * * * *